G. H. WADE.
WATER HEATER.
APPLICATION FILED SEPT. 2, 1908.
941,215.
Patented Nov. 23, 1909.
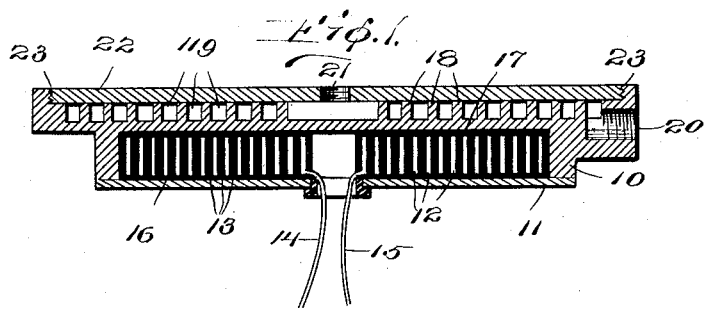
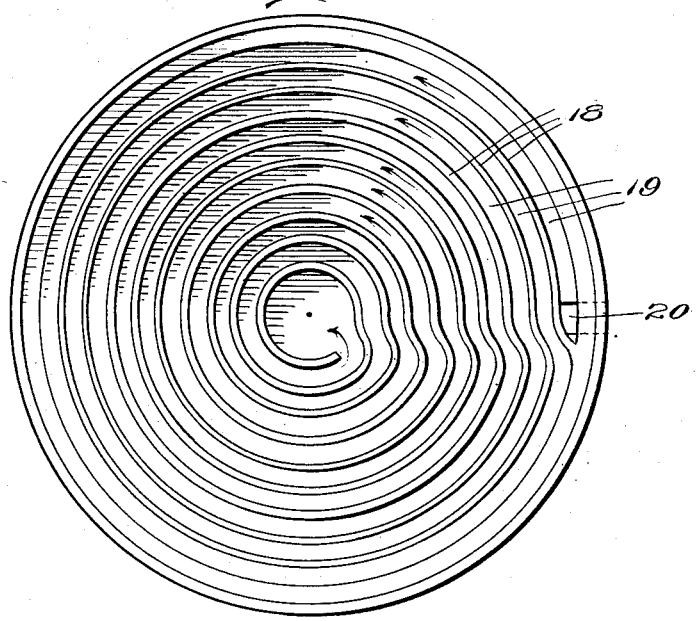
Inventor,
George H. Wade,

UNITED STATES PATENT OFFICE.

GEORGE H. WADE, OF ATLANTA, GEORGIA.

WATER-HEATER.

941,215.  Specification of Letters Patent.  Patented Nov. 23, 1909.

Application filed September 2, 1908. Serial No. 451,320.

*To all whom it may concern:*

Be it known that I, GEORGE H. WADE, a citizen of the United States, residing at Atlanta, in the county of Fulton and State of Georgia, have invented certain new and useful Improvements in Water-Heaters; and I do hereby declare the following to be a full, clear, and exact description of the invention, such as will enable others skilled in the art to which it appertains to make and use the same.

This invention relates to water heaters heated electrically, and has for an object to provide a device adapted to employ the heating unit forming the subject-matter of Patent No. 897,326.

A further object of the invention is to provide means adapted to be inclosed within a minimum area and to be connected with a source of water supply whereby the water travels a maximum distance in contact with the heated area.

A further object of the invention is to provide in a device of the class a heating unit adapted to heat a plate-like portion and with means forming a continuous passageway in successive convolutions in contact with such heated area.

With these and other objects in view, the invention comprises certain novel constructions, combinations and arrangements of parts, as will be hereinafter fully described and claimed.

In the drawings:—Figure 1 is a view in diametrical section of the improved water heater. Fig. 2 is a top plan view of the improved water heater with the top plate removed showing the convolutions of the water circuit. Fig. 3 is a detail view of the resistance.

Like characters of reference designate corresponding parts throughout the several views.

The water heater forming the subject-matter of the present invention is adapted to be connected in any approved manner with a source of water supply under pressure and with a source of electrical energy, and comprises a casing 10 having a recess in one side inclosed by a plate 11 within which the heating element is inclosed. The heating element preferably corresponds to the heating element described in said Patent Number 897,326, and is here illustrated as comprising a resistance 12 sinuous in form disposed between convolutions of the insulating material as 13 preferably mica or other thin material offering a great amount of resistance to the passage of the electric current, such resistance and insulation being wound in successive convolutions in the circular opening in the casing 10 and provided with terminals 14 and 15 for connection with any approved source of electrical energy. The coiled resistances are, of course, insulated from the casing 10 as by the insulations 16 and 17 so that such resistances do not come in contact with the casing which is preferably of metal.

On the side of the casing opposite the heating element a plurality of ribs 18 are formed producing therebetween a spiral groove 19 communicating at the outer end by means of a passage 20 with an inlet supply and centrally as by the outlet 21 with a discharge outlet.

A plate or closure member 22 provided with the opening 21 is seated to bear upon the upper surfaces of the ribs 18 and is preferably held in position by means of the screw threads 23 shown particularly in Fig. 1 although any approved means for holding such closure in position is comprehended within the present invention.

While the heating element here shown is illustrated specifically as the heating unit disclosed in the aforesaid patent it is to be understood that any means for heating the device electrically is comprehended within the present invention and that the present invention is not limited to the specific form of heat unit.

It will be apparent that with the current supplied through the terminals 14 and 15 the partition between the heating chamber and the water chamber will become heated and that water admitted through the passage 20 and passing successively about through the passage 19 in contact with such partition becomes heated prior to its discharge through the opening 21.

What I claim is:—

1. In a heater, a casing provided with a spiral groove terminating at the center and periphery, means to admit water to one end of such groove and discharge it from the opposite end, and means to apply heat to the spiral convolutions.

2. In a water heater, recesses separated by a dividing partition, a spiral passage formed in contact with the partition upon one side and terminating at the center and periphery, and a heating element in contact with the partition upon the opposite side.

3. In a water heater, a substantially circular casing provided with chambers upon opposite sides, one of such chambers being provided with a spiral passage terminating at the center and periphery, a heating element disposed within the other chamber, and means to admit and discharge water from opposite ends of the spiral passage.

4. In a water heater, a substantially circular casing member provided with a circular chamber upon one side, and a circular chamber upon the opposite side, such chambers being separated by a partition, a spiral rib formed in one chamber producing a spiral passage-way leading from the periphery to the center, means to admit water at one end of the passage and discharge it from the opposite end, and means to heat the opposite chamber.

5. In a water heater, a substantially circular casing provided with opposed chambers separated by a partition wall, a spiral rib formed in one chamber producing a spiral passage-way having an outlet at the periphery at one end and at the center at the opposite end, a resistance coil disposed within the opposite chamber, and means to connect the resistance coil with the source of electrical energy.

6. In a device of the class described, a chamber, a heater disposed within the chamber, a cover for the chamber provided with means for admitting energy to the chamber, spiral ribs formed upon the opposite side of the chamber wall defining a spiral groove having one end terminating at the center and the opposite end terminating at the periphery, and a cover adapted to bear upon the ribs and convert the spiral groove into a spiral conduit, and having a central passage communicating with the central end of the spiral conduit.

In testimony whereof I affix my signature in presence of two witnesses.

GEORGE H. WADE.

Witnesses:
J. T. HOLLEMAN,
R. L. REYNOLDS.